July 5, 1938.      M. R. JOHNSON      2,123,050
VARIABLE CAPACITOR
Filed April 12, 1935

Inventor:
Marwin R. Johnson,
by Harry E. Dunham
His Attorney.

Patented July 5, 1938

2,123,050

UNITED STATES PATENT OFFICE 2,123,050

VARIABLE CAPACITOR

Marwin R. Johnson, Schenectady, N. Y., assignor to General Electric Company, a corporation of New York Application April 12, 1935, Serial No. 16,004

3 Claims. (Cl. 175—41.5)

My invention relates to variable capacitors such for example as those employed in oscillation circuits. One of the common causes of the lack of frequency stability in oscillation circuits including variable capacitors is the change in capacitance of the capacitor due to the mechanical expansion and contraction of the parts constituting the capacitor as a result of changes in the ambient temperature. Another common cause of frequency instability in such circuits is the change in the electrical constants of any element or combination of elements constituting the oscillation circuit as a result of ambient temperature changes.

One object of my invention is the provision of an improved variable capacitor having means by which compensation is automatically effected for the changes in capacitance of the capacitor due to the effect of ambient temperature changes. Another object is the provision of such a capacitor having means for automatically compensating for changes in the constants of the circuit in which the capacitor is used due to ambient temperature changes.

My invention will be understood from the following description taken in connection with the accompanying drawing, and its scope will be pointed out in the appended claims.

Figure 1:
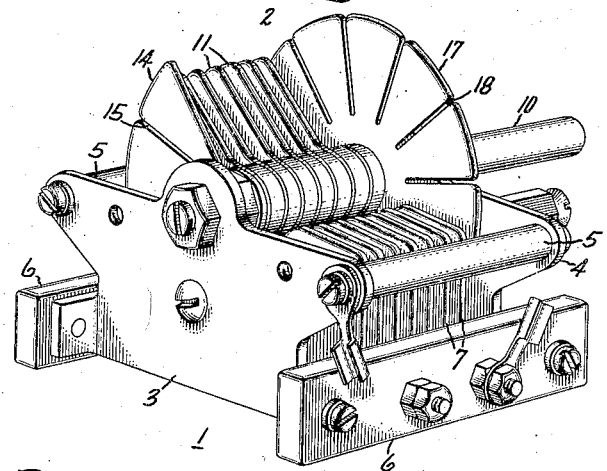

Referring to the drawing, Fig. 1 is a perspective view of a capacitor constructed in accordance with my invention; Figs. 2 to 6 inclusive show various forms of compensating capacitor plates forming a part of the capacitor shown in Fig. 1.

For purposes of illustrating my invention I have chosen to show it as applied to a variable capacitor of a well known form which comprises a fixed element or stator 1 and a movable element or rotor 2. The stator comprises the two metallic end plates 3 and 4 which at their ends are secured together in spaced relation by the metal rods 5 and by the insulation bars 6. Secured to the insulation bars 6 is the series of spaced fixed metal plates 7, which plates are firmly held in proper spaced relation by metal bars, not shown, which bars in turn are bolted to the insulation bars 6.

The rotor comprises the shaft 10 which is mounted in suitable bearings in the end plates 3 and 4 to which shaft is secured the series of metal rotor plates 11. These plates are spaced apart the same distance as the plates of the stator and are arranged to interleave with the stator plates. The rotor plates 11 preferably are substantially semicircular in form though obviously they may, if desired, comprise sectors of more or less than a half circle. The shaft 10 is adapted to receive any desired means by which the rotor may be turned to adjust the capacitance of the capacitor. As mentioned above it has been found that when a variable capacitor of the type illustrated has been employed as an element in an oscillation circuit where frequency stability is an important consideration, the effect of the mechanical expansion and contraction of the parts of the capacitor due to changes in the ambient temperature has so changed the capacitance of the capacitor as to seriously interfere with the frequency stability. In the capacitor which I have devised and which I shall now describe, I have provided means for compensating for such changes in the capacitance.

As shown in Fig. 1, I have provided the rotor with the special plate 14 which is secured to the shaft at one end of the series of rotor plates so as to cooperate with the outer face of the stator plate at the corresponding end of the stator. Plate 14 is constructed of bimetallic material, that is, it is composed of two identical component plates of metals having different coefficients of expansion, the two plates being firmly secured together whereby in response to changes in temperature the bimetallic plate will bend slightly toward or away from the adjacent stator plate. Plate 14 may be similar in form to the rotor plates, that is, semicircular, as shown for example in Fig. 2 and is provided with a series of radial slits 15 by which the plate is divided into a series of sectors. With such a capacitor construction, should the temperature increase after the capacitor is adjusted to a proper value for a desired oscillation frequency thereby, causing the parts of the capacitor to expand and so increase the capacitance, the plate 14 will bend away from the adjacent stator plate and the amount of such movement will be just sufficient to compensate for the increase in capacitance due to the expansion of the parts. Likewise the reverse operation takes place with a decrease in temperature.

Obviously the amount of compensation required for a certain predetermined temperature change in the capacitance is not the same for all positions of adjustment of the capacitor but increases as the capacitor is adjusted to increase the amount of capacitance provided thereby; that is, as the rotor is turned to cause greater overlapping of the rotor and stator plates a greater amount of compensation is required. Since the bimetallic plate 14 is semicircular in form like the rotor plates 11 and turns therewith it will be seen that its overlap with the adjacent stator plate and therefore the compensation effect thereof varies with the position of the rotor, hence it provides the proper amount of compensation for the various positions of adjustment of the rotor.

As pointed out above one of the common causes of frequency instability in oscillation circuits is the change in the electrical constants of an element or elements constituting the circuit. In the capacitor which I have described and illustrated herein I have provided means to compensate also for variations in frequency due to such causes. Secured to the shaft 10 at that end of the series of rotor plates opposite to the plate 14 I have provided the plate 17 which also is constructed of bimetallic material but which is shown, see Fig. 3, as being circular in form. This plate like plate 14 is provided with radial slits 18 dividing the plate into a series of sectors thereby better to enable the plate to bend toward and away from the outer face of the adjacent stator plate. Plate 17 is constructed to bend in the proper direction with reference to the adjacent stator plate to effect the desired compensation for changes in the constants of a circuit with which the capacitor is to be used as a result of temperature changes. For example, if the circuit includes an inductor whose inductance increases with an increase in temperature due to a deformation of the coils of the inductor, the plate 17 will be constructed to bend away from the adjacent stator plate thereby to decrease the capacitance provided by the capacitor. Since the rotor plate 17 is circular in form it will be seen that the change in capacitance provided thereby is the same for all positions of the rotor, being entirely independent of the setting of the rotor. It will be understood that the amount of deflection of each of the plates 14 and 17 may be governed by the choice of the materials constituting each of those plates and by the relative thicknesses of the two components of each plate in order that each plate may deflect the proper amount to afford the desired compensation in each case.

Figure 4:
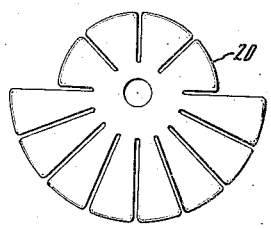

Under certain circumstances it may be desirable to combine the effects of the two plates 14 and 17 in a single plate. In Fig. 4 I have illustrated such a combined plate at 20, that portion of the plate corresponding in function to the plate 17 being somewhat smaller than that plate.

Figure 2:
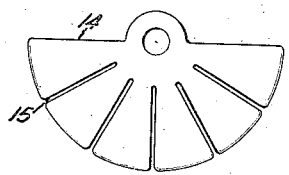
Figure 3:
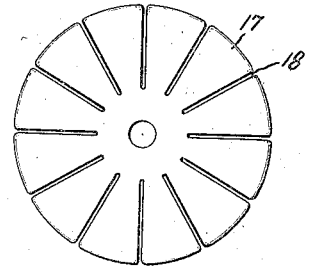
Figure 6:
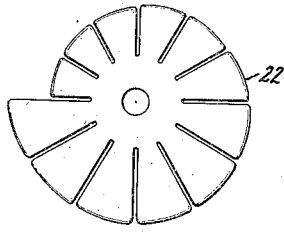
Figure 5:
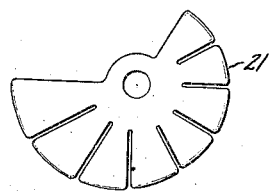

The effect of temperature changes on the capacitor may be such that a configuration different from that shown in Fig. 2 may be necessary to effect the desired complete compensation for those changes. A compensating plate having a form such as shown, for example, at 21 in Fig. 5 may therefore be required, the particular configuration of the plate being governed in each case by the exact amount of compensation required in the various angular positions of the capacitor rotor. Likewise the plate which compensates for the effect of temperature variations in the circuit may require a configuration different from that shown by Fig. 3 since factors other than the ambient temperature affect the circuit constants, for example, the heating of the circuit due to the current traversing it, which heating may depend upon the setting of the capacitor. Where a single plate is employed to completely compensate for temperature changes both in the capacitor itself and in the circuit with which it is used, the configuration may be of a rather complex character and may be like that shown by way of example at 22 in Fig. 6.

I have chosen the particular embodiments described above as illustrative of my invention and it will be apparent that other modifications may be made without departing from the spirit and scope of my invention which modifications I aim to cover by the appended claims.

What I claim as new and desire to secure by Letters Patent of the United States is:

1. A variable capacitor comprising a stator having a fixed plate, a rotor having a cooperating movable plate and means for compensating for the effect of temperature changes in a circuit associated with the capacitor comprising a bimetallic plate mounted on said rotor and arranged to cooperate with said stator plate equally in all positions of adjustment of said rotor.

2. A variable capacitor comprising a stator having a fixed plate, a rotor having a cooperating movable substantially semi-circular plate and means for compensating for the effect of temperature changes in a circuit associated with the capacitor comprising a substantially circular bimetallic plate mounted on said rotor and arranged to cooperate with said stator plate.

3. A variable capacitor comprising a stator including a group of fixed plates, a rotor including a group of substantially semi-circular plates arranged to interleave with said stator plates, a bimetallic substantially semi-circular plate secured to said rotor and arranged opposite the outer face of the stator plate at one end of said stator group and a bimetallic substantially circular plate secured to said rotor and arranged opposite the outer face of the stator plate at the other end of said stator group.

MARWIN R. JOHNSON.